United States Patent
Jouenne et al.

(10) Patent No.: US 6,286,085 B1
(45) Date of Patent: *Sep. 4, 2001

(54) SYSTEM FOR BACKING UP DATA SYNCHRONOUSLY AND ASYNCHRONOUSLY DEPENDING ON A PRE-ESTABLISHED CRITERION

(75) Inventors: Franck Jouenne, Le Plessis Trevise; Dominique Guidot, Sevres; Benoît Paul-Dubois-Taine, Bourg la Reine, all of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,876

(22) Filed: Apr. 22, 1997

(30) Foreign Application Priority Data

Apr. 21, 1997 (FR) .................................................. 97 04881

(51) Int. Cl.$^7$ ..................................................... G06F 12/00
(52) U.S. Cl. ............................................ 711/162; 711/161
(58) Field of Search ...................... 711/162, 113; 395/181, 182.11, 489; 714/6; 707/204

(56) References Cited

U.S. PATENT DOCUMENTS

| | | | | |
|---|---|---|---|---|
| 5,133,065 | * | 7/1992 | Cheffetz et al. | 395/181 |
| 5,226,157 | * | 7/1993 | Nakano et al. | 711/162 |
| 5,390,186 | * | 2/1995 | Murata et al. | 711/113 |
| 5,555,371 | * | 9/1996 | Duyanovich et al. | 714/13 |
| 5,649,196 | * | 7/1997 | Woodhill et al. | 707/204 |
| 5,659,614 | * | 8/1997 | Bailey, III | 380/4 |
| 5,692,155 | * | 11/1997 | Iskiyan et al. | 395/489 |
| 5,742,792 | * | 4/1998 | Yanai et al. | 711/162 |
| 5,771,367 | * | 6/1998 | Beardsley et al. | 711/162 |
| 5,799,141 | * | 8/1998 | Galipeau et al. | 395/182.11 |

FOREIGN PATENT DOCUMENTS 0 332 210 A2   9/1989   (EP) .
0 616 285 A3   9/1994   (EP) .

* cited by examiner

Primary Examiner—Do Hyun Yoo
Assistant Examiner—Nasser Moazzami
(74) Attorney, Agent, or Firm—Sughrue, Mion, Zinn, Macpeak & Seas, PLLC

(57) ABSTRACT

The invention relates to a database system comprising a plurality of stations ($10_1, 10_2, \ldots, 10_n$) communicating with one another. The data that is inserted or updated in an originating station is backed up in at least one other station referred to as a "receiving" station. Means are provided so that data of a determined kind can be backed up synchronously or asynchronously on another station depending on whether or not a pre-established criterion is satisfied. For example, data that is modified progressively is backed up asynchronously until the data has finished being modified, and is backed up synchronously once modification has been finished. Such data may be routing data in a telecommunications system.

9 Claims, 1 Drawing Sheet

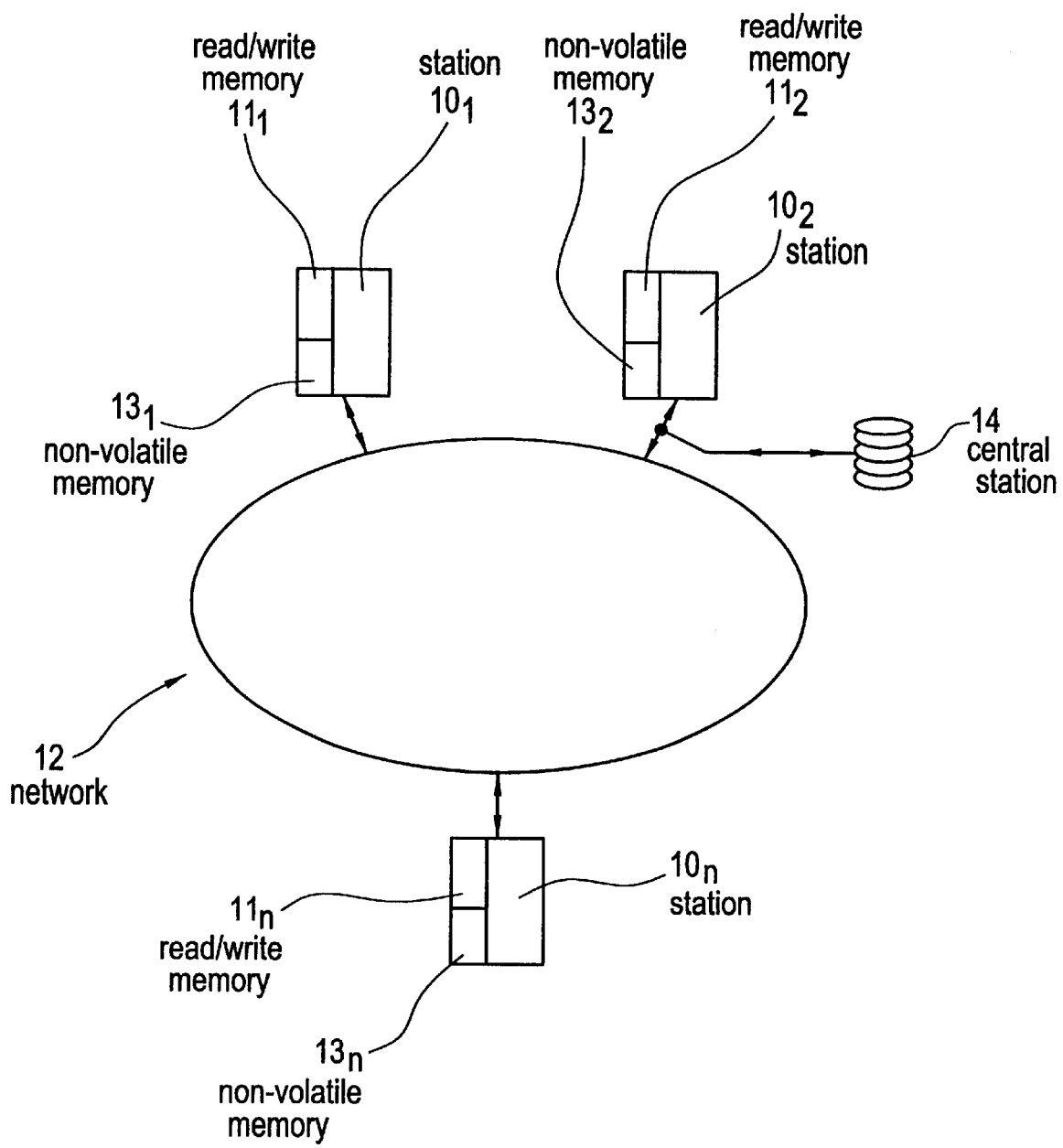

SYSTEM FOR BACKING UP DATA SYNCHRONOUSLY AND ASYNCHRONOUSLY DEPENDING ON A PRE-ESTABLISHED CRITERION

BACKGROUND OF THE INVENTION

The invention relates to a system comprising a plurality of data-receiving stations distributed over a network.

In general, a database system comprises a central station in which data is stored on a permanent basis, generally on a magnetic disk referred to as a "hard disk". In certain applications, the data comes from decentralized stations.

Each station receives data that must be backed up in temporary or permanent manner on another station in order to provide against failures at the station receiving the data.

Backup takes place in read/write memory and/or in non-volatile memory and at least (or at most) one other station. This backup can also be performed in non-volatile memory at the station concerned and/or on the hard disk of the central station. The type of backup depends on the nature of the data.

Thus, in a telecommunications system, the central station contains data that is modified rarely and that is used frequently, which data is backed up on hard disks. By way of example, this data constitutes subscriber descriptions and the configuration of the network. This data backed up on hard disks is referred to as "semi-permanent" data. Also, other data referred to as "product" data, such as billing, is backed up in general in the read/write memory and/or the hard disk of several other stations. Finally, so-called "context" data such as memorizing the location of a mobile telephone, or the connections that have been set up to establish calls, are backed up in read/write memory and/or in non-volatile memory in at least one other station.

Whatever the location in which the data is backed up, backup can be performed in two modes: a synchronous mode, and an asynchronous mode.

Synchronous backup consists in making a replica or copy of the data simultaneously or quasi-simultaneously with the data being put into memory in the originating station. This type of backup provides a high degree of security since it takes place in real time and is therefore unaffected by any incidents that might occur subsequently. Nevertheless, it is burdensome since it requires the use of a call while the data is being inserted. Also, the length of time taken to put the data into memory at the originating station is determined by the duration of the call, and that is generally significantly longer than the time required merely for putting data into memory.

Asynchronous type backup consists in making modifications on the original, i.e. at the data-issuing station, independently of transmitting data to the copies or replicas. Transmission to other stations takes place in deferred manner. It is performed either when a communications system becomes available, or else in periodic manner, at previously selected moments.

With asynchronous backup, updating takes place locally more quickly than when backup is performed synchronously, since the original can be updated without being subjected to the time required for transmitting the data to another station. In contrast, such backup is less secure since between the data being updated and the data being transmitted, i.e. backed up, the update may be lost because of an incident occurring at the station concerned.

SUMMARY OF THE INVENTION

The invention relates to backing up data and results from the observation that in presently known systems backup is not optimized under all situations.

The invention makes such optimization possible.

The invention is characterized in that means are provided so that data of a determined kind can be backed up synchronously or asynchronously on another station depending on whether or not a pre-established criterion is satisfied.

Thus, for data whose type of backup can be selected at will, the system is free to give precedence, as a function of circumstances, either to backup security (synchronous mode) or else to updating speed and to minimizing disturbances on transmission (asynchronous mode).

For a telecommunications system, it is data that can be backed up on a single station that will have this freedom of choice between synchronous backup and asynchronous backup. This applies in particular to context data. In contrast, semi-permanent data should, in theory, always be backed up in synchronous manner. That part of product data which is backed up on at least two stations will generally also be backed up in synchronous manner, so as to avoid running the risk of backing up inconsistent data on a plurality of stations.

It should be observed that unlike the usual practice in databases, the possibility is reserved of performing backups on hard disk in asynchronous manner either at the originating station or at another station.

Other characteristics and advantages of the invention appear from the description of various embodiments given with reference to the sole figure which is a diagram of a database system.

BRIEF DESCRIPTION OF THE DRAWINGS

The FIG. 1 is a diagram illustrating a telecommunications system having a plurality of stations on a network.

DETAILED DESCRIPTION OF THE INVENTION

The embodiment of the invention described with reference to the figure relates to a telecommunications system in which a plurality of stations $10_1, 10_2, \ldots, 10_n$ are disposed in a network 12. In addition, a central station 14 is provided for backing up all of the data. The station 14 is different from the stations $10_i$; however it may be located in the same place as one of those stations, e.g. the station $10_2$, as shown.

Each of the stations includes a computer with read/write memory $11_1, 11_2, \ldots, 11_n$ and non-volatile memory, e.g. in the form of a magnetic disk $13_1, 13_2, \ldots, 13_n$.

In this telecommunications system, each station $10_i$ receives the data which is put into memory in that station. This data is also backed up on another station, so as to provide against failure at the station concerned.

For backup purposes, data is classified into three categories:
  semi-permanent data which is backed up on the hard disk of the central station 14 and, optionally (as selected by the file manager) on the hard disk at at least one station other than the issuing station;
  product data which is backed up on at least one other station, in read/write memory and/or in non-volatile memory; and finally
  context data which is backed up in the read/write memory and/or non-volatile memory of at least one other station.

Backup is performed either synchronously, or else asynchronously.

Synchronous backup consists in making security copies simultaneously or quasi-simultaneously with the data being updated in the issuing station.

Asynchronous back consists in separating the instant at which updating takes place in the issuing station and the instant at which one or more copies are made in another station.

Table 1 below shows synchronous backup in the memory of another station of a modification to data.

TABLE 1

Synchronous backup in read/write memory

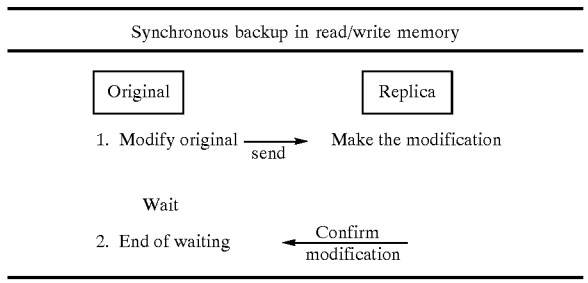

In this table, the term "original" corresponds to the station, e.g. the station referenced $10_1$, where the modification takes place, while the mention "replica" correspond to the station, e.g. the station referenced $10_n$, where the data update is backed up.

In this example, backup is performed in read/write memory, not in non-volatile memory.

It can be seen from the table that during a first step, data in the issuing station $10_1$ is modified in its own read/write memory, and is simultaneously sent to the backup station where the data is simultaneously recorded ("make the modification") in the read/write memory of this station.

During the call, the program for modifying the data in the issuing station is caused to wait, i.e. no further modification can be performed during this time by the program that has modified the data.

In contrast, if other data is being modified in the same station, then the corresponding programs running at the station can make those modifications on data other than the data that is in the process of being updated.

During a second step, the backup station sends a message to the issuing station confirming that the modification has been made. On receiving this signal, the modifying program is reactivated.

The advantage of this kind of backup procedure is security. Since backup takes place in real time, data is immediately memorized in two stations, thereby minimizing the risk of data loss because of an incident at one of the stations.

Table 2 below illustrates asynchronous backup into read/write memory.

TABLE 2

Asynchronous backup in read/write memory

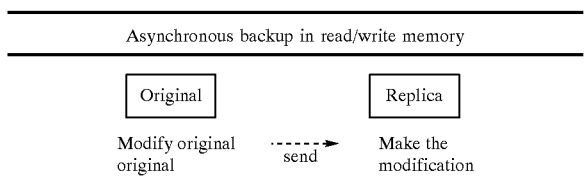

In this table, and in the tables below, the terms "original" and "replica" have the same meanings as in Table 1.

The dashed line arrow means that the data is put immediately into the memory of the issuing station and is transmitted in deferred time to the receiving station where a copy is made in read/write memory. Transmission takes place either when no other call is expected between the stations, or else at the end of a predetermined time lapse, e.g. a few minutes.

Compared with synchronous backup, as shown in Table 1, this backup procedure has the advantage of minimizing the time required to make the modification at the issuing station, since that time is not lengthened by call duration.

However, security is reduced since there is no backup during the period between the time a modification takes place in the issuing station and the time when the modification is transmitted to the receiving station.

Table 3 below shows a synchronous backup procedure using read/write memory at the receiving station and a hard disk at the issuing station.

TABLE 3

Synchronous backup to read/write memory and hard disk

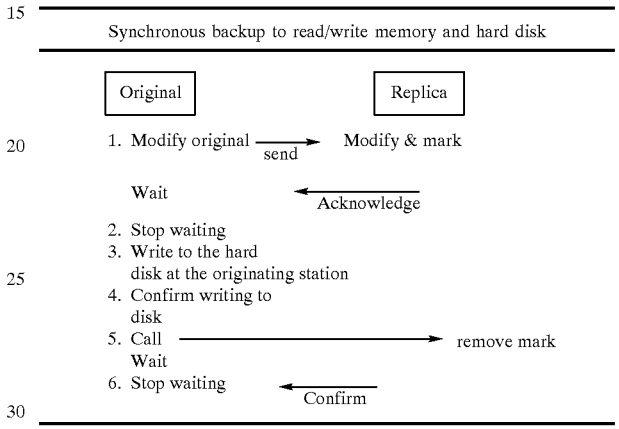

In this procedure, the first step consists in modifying the original and simultaneously sending the modification to the read/write memory of the receiving station. During this call, from the issuing station to the receiving station, no other modification can be made in the issuing station. As explained above with reference to Table 1, the wait applies only to the program that is modifying the data concerned.

A mark is made in the memory of the receiving station indicating that the data has been modified. This mark is a safety feature, whose role is explained below.

After modification at the receiving station, it returns an acknowledge signal to the issuing station, thereby releasing the program making the modifications at said issuing station.

The third step consists in writing the modification to the hard disk (non-volatile memory) of the issuing station.

Thereafter (fourth step), the modifying program is again released.

The fifth step consists in the issuing station sending a signal to the receiving station for the purpose of removing the mark associated with the recording in the read/write memory of the receiving station.

This final step releases the program performing the modification.

The temporary mark written in the memory of the receiving station makes it possible to restrict the amount of data that needs to be recovered (the modified data) in the event of an incident occurring at the issuing station.

This method offers a high level of security. However, it suffers from the drawback of requiring relatively long call duration or execution time.

Table 4 below shows the procedure for asynchronous backup to read/write memory of another station and to the hard disk of the issuing station.

TABLE 4

| Original | | Replica |
|---|---|---|
| 1. Modify original | →send | Modify & mark |
| 2. Send the modification to the read/write memory controlling the hard disk at the originating station | | |
| 3. Asynchronous modification on the hard disk of the originating station | | |
| 5. | --------→ | remove mark |

The first step is to modify the original at the originating station. This modification is transmitted in asynchronous mode to the replica. Once the call has been established, the read/write memory of the replica is updated and marked.

Thereafter, or simultaneously, the modification is sent to the read/write memory controlling the hard disk of the originating station. The disk is updated in asynchronous mode.

Once the disk has been updated, a remove-mark signal is sent, likewise in asynchronous mode to the read/write memory or "replica" of the receiving station.

Some data is always backed up in synchronous manner. Other data can be backed up synchronously or asynchronously, on request. It may be observed that if the same request provides for some data to be backed up synchronously and other data to be backed up asynchronously, then backup takes place automatically in synchronous manner.

The invention lies in the option, at least for some data, of backup being performed at will either in synchronous mode (Table 1 or 3) or else in asynchronous mode (Table 2 or 4).

An application of the invention is as follows: in a telecommunications system, routing for setting up a connection between two determined points is performed in a progressive manner. Routing data is context data. If routing does not terminate, the data relating to the routing is backed up in asynchronous mode. However once the routing operation has terminated, the corresponding context data is backed up in synchronous mode.

Naturally, the invention is not limited to the type of transmission in the network. This transmission may be of Ethernet, ATM, etc. type.

What is claimed is:

1. A database system comprising a plurality of stations ($10_1, 10_2, \ldots, 10_n$) communicating with one another, said database system including a backup system whereby data inserted and data updated in an originating station is backed up in at least one other station referred to as a "receiving" station, said backup system selectively backing up data of a determined kind in one of two modes, said modes comprising a synchronous mode and an asynchronous mode, depending on a precedence given to backup security, updating speed and minimization of disturbances on transmission of backup data, with said backup system backing up said data sometimes in said synchronous mode and sometimes in said asynchronous mode.

2. A system according to claim 1, characterized in that backup is performed in non-volatile memory, such as a hard disk, and takes place at the originating station.

3. A system according to claim 2, characterized in that backup in said non-volatile memory at the originating station is performed in an asynchronous manner.

4. A system according to claim 2, characterized in that backup is performed in read/write memory of another receiving station prior to performing said backup in non-volatile memory at the originating station.

5. A system according to claim 4, characterized in that data that is being backed up in the read/write memory of the receiving station is marked, with the mark data being removed after backup has been achieved in the non-volatile memory of the originating station.

6. A database system comprising a plurality of stations ($10_1, 10_2, \ldots, 10_n$) communicating with one another, said database system including a backup system whereby data inserted and data updated in an originating station is backed up in at least one other station referred to as a "receiving" station, said backup system backing up data of a determined kind in one of two modes, said modes comprising a synchronous mode and an asynchronous mode, depending on whether or not a pre-established criterion is satisfied, characterized in that data that is modified in progressive manner is backed up asynchronously until modification of said data has been terminated, and is further backed up synchronously at the end of modification.

7. A system according to claim 6, characterized in that the progressively modifiable data is routing data.

8. A database system comprising a plurality of stations communicating with one another, said database system including a backup system whereby data inserted and data updated in an originating station is backed up in at least one other station referred to as a "receiving" station, said backup system backing up data of a determined kind in one of two modes, said modes comprising a synchronous mode and an the asynchronous mode, depending on a precedence given to backup security, updating speed and minimization of disturbances on transmission of backup data, characterized in that the data is telecommunications data.

9. A database system comprising a plurality of stations communicating with one another, said database system including a backup system whereby data inserted and data updated in an originating station is backed up in at least one other station referred to as a "receiving" station, said backup system backing up data of a determined kind in one of two modes, said modes comprising a synchronous mode and an asynchronous mode, depending on a precedence given to backup security, updating speed and minimization of disturbances on transmission of backup data, characterized in that data of a determined kind is backed up in the asynchronous mode when it is desired to minimize the time required for putting the data into memory at the originating station, and in that the data is backed up in the synchronous mode when it is desired to maximize backup security.

* * * * *